P. C. BARNES ET AL 2,720,060

APPARATUS FOR SIMULTANEOUSLY SURFACING BOTH
SURFACES OF A MOVING RIBBON OF GLASS

Filed Oct. 14, 1953

Inventors
P. C. Barnes
T. S. Cook
By
Morrison Kennedy Campbell Attorneys

FIG. 12.

Oct. 11, 1955   P. C. BARNES ET AL   2,720,060
APPARATUS FOR SIMULTANEOUSLY SURFACING BOTH
SURFACES OF A MOVING RIBBON OF GLASS
Filed Oct. 14, 1953   7 Sheets-Sheet 7

Inventors
P. C. Barnes
T. S. Cook
By
Morrison Kennedy Campbell Attorneys

United States Patent Office 2,720,060
Patented Oct. 11, 1955

2,720,060

APPARATUS FOR SIMULTANEOUSLY SURFACING BOTH SURFACES OF A MOVING RIBBON OF GLASS

Philip C. Barnes, Eccleston Park, Prescot, and Thomas S. Cook, Eccleston, St. Helens, England, assignors to Pilkington Brothers Limited, Liverpool, England, a British company Application October 14, 1953, Serial No. 386,014

Claims priority, application Great Britain November 17, 1952

9 Claims. (Cl. 51—112)

This invention relates to apparatus for simultaneously surfacing both surfaces of a moving ribbon of glass.

In the usual manufacture of ground and polished plate glass it is known to flow molten metal from a glass melting tank between sizing rollers which produce a continuous ribbon of glass which is then passed on supported rollers through a lehr tunnel whereby the rate of cooling of the glass is regulated. The ribbon is then advanced between a series of disc shaped grinding tools to which abrasive suspended in water is fed, the abrasive usually being sand which is very carefully graded so that the coarser sand particles are supplied to the first tools met by the ribbon. The series of grinding tools is arranged in coaxial pairs of which the axes are perpendicular to the glass, the series of grinding tools being completed by coaxial pairs supplied with finer sand particles and these effect the operation which is known as "smoothing," which expression comprehends the fine grinding done by the last few tools, so that the ribbon is first subjected to grinding and afterwards to smoothing as a continuous operation and the final surface produced is termed the "smooth."

After the ribbon has passed between the smoothing grinders it is subjected to the rubbing action of a series of polishing tools, and after leaving the polishers the ribbon is cut repeatedly at a predetermined distance from the free end. The tools which effect grinding, smoothing, and polishing are collectively herein referred to as surfacing tools.

Surfacing tools have heretofore been arranged in pairs with their axes in vertical planes disposed obliquely to the path of the ribbon, the object being to obtain a surfacing effect which is, as nearly as possible, uniform across the width of the ribbon.

The ribbon of glass is advanced through the series of surfacing tools by pairs of driving rollers which extend across the ribbon, one roller of each pair being above the ribbon and the other below the ribbon, the axes of a pair being in a vertical plane at right angles to the direction of movement of the ribbon.

Accordingly it will be observed that an installation for grinding and polishing a moving ribbon of glass on both surfaces simultaneously is increased in length in the endeavour to obtain uniformity in the surfacing effect across the width of the ribbon, thus greater factory space is required, higher capital and maintenance costs are involved and a greater possibility of the ribbon cracking or breaking occurs than when a linear series of tools is employed all disposed centrally of the ribbon.

The main object of the present invention is to avoid the disadvantages mentioned when employing tools arranged in pairs disposed in vertical planes which are oblique to the path of the ribbon, thus obtaining the aforesaid optimum conditions for uniformity in the surfacing effect across the width of the ribbon in a more economical manner.

Apparatus for simultaneously surfacing both surfaces of a moving ribbon of glass including co-operating pairs of tools the axes of which are disposed in vertical planes disposed obliquely to the path of the ribbon, the tools of a pair operating on one surface being coaxial with a similar pair operating on the other surface and driving means for the ribbon operating against each face of the ribbon arranged between one pair of tools and an adjacent pair constructed according to the present invention is characterized by each driving means being constituted by a set of short rollers carried by a beam disposed obliquely to the path of the ribbon, whereby the rollers are arranged in echelon from edge to edge of the ribbon, the axes of the rollers being disposed at right angles to the direction of movement of the ribbon, whereby the driving rollers support the ribbon in areas contiguous with both tools of an obliquely disposed coaxial pair.

Each beam supporting the driving rollers may be provided with a series of hollow brackets provided with axle bearings for the rollers, said brackets housing the actuating means for the axles.

In one preferred construction according to the invention the apparatus comprises a driving shaft for each set of rollers housed by the respective beam, bevel wheels keyed to the shaft and axially adjustable thereof, a spindle carried by each bracket at right angles to the shaft, a bevel gear on each spindle with which a bevel on the shaft meshes to drive the spindle, actuating means for the axles comprising a worm wheel on the respective axle and a worm on each spindle meshing with the worm wheel, and means for synchronously driving the driving shafts above and below the ribbon of glass. The rollers in each set may be mounted in pairs, one roller being keyed on each end of each axle.

Instead of providing an actuating spindle and a worm and worm wheel in the bracket to actuate the roller associated with the bracket an electric motor may be housed in the beam for actuating the respective axle, the hollow beam carrying the mains supplying current to the motors.

In order that the invention may be more clearly understood the same preferred embodiments will now be further described by way of example with reference to the accompanying diagrammatic drawing in which.

In the drawings like references designate the same or similar parts.

Figure 1:
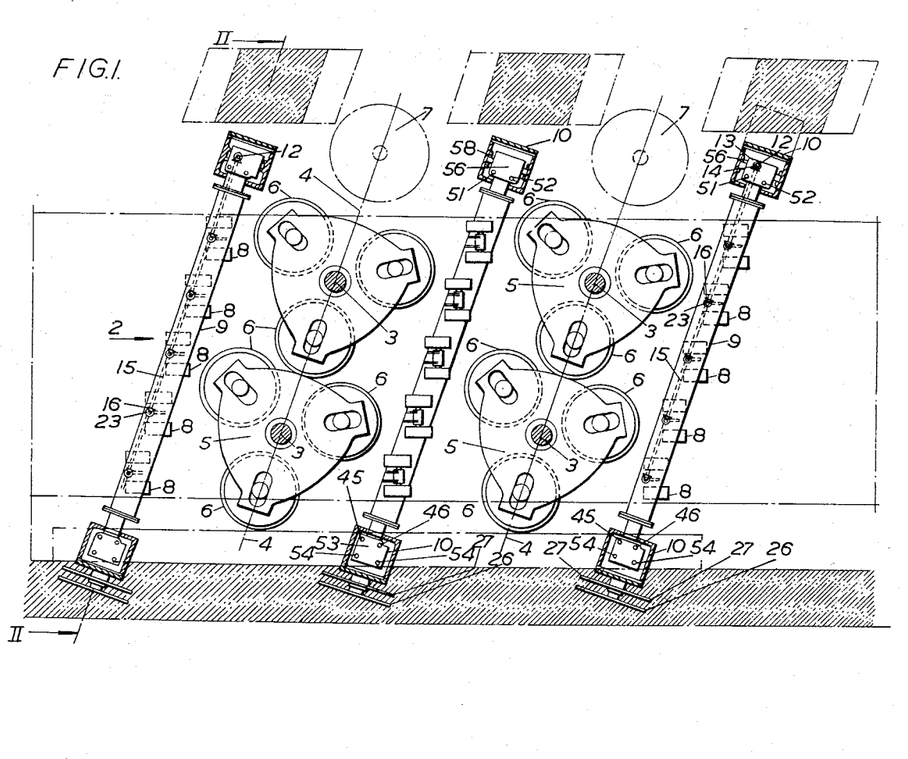
Figure 1 is a plan view of part of a series of polishing tools disposed in pairs, the axes of which are contained in vertical planes disposed obliquely to the path of the ribbon of glass and the general disposition of the two sets of short driving rollers for the ribbon in accordance with the invention.

Referring first to Figures 1 to 10 of the accompanying drawings:

A ribbon of plate glass 1 which has been formed in known manner by sizing rollers and has passed through a cooling lehr and between a series of coaxial grinding tools simultaneously operating on each surface of the ribbon is shown in Figure 1 advancing in the direction indicated by the arrow 2 between coaxial polishing tools, the axes of which are indicated at 3, 3, the tools being arranged to operate on each surface of the ribbon in co-operating pairs the axes of which are disposed in vertical planes indicated by the chain lines 4—4 which planes are oblique to the path of the ribbon. Each tool comprises a driving frame indicated at 5 on which are mounted polishing discs 6 covered by felts, all arranged as is well known in the art, the tools being constantly rotated in co-operating pairs by a respective motor indicated at 7.

The ribbon is constantly advanced in accordance with the present invention by driving means disposed at suitable intervals and comprising two co-operating sets of short rollers indicated at 8 arranged in similar pairs above and below the ribbon 1, each pair of short rollers being supported on hollow bears 9 of rectangular section (see Figure 4) disposed obliquely to the path of the ribbon. In the construction illustrated the beams are parallel to the vertical planes 4 containing the axes of the co-operating polishers but the axes of the rollers are all at right angles to the direction of movement of the glass.

As clearly shown in Figure 1 the short rollers are arranged in pairs in each set and are arranged in echelon across the ribbon in front of and following the two co-operating pairs of coaxial polishing tools illustrated.

In the arrangement shown in Figure 1 a similar set of short rollers arranged in echelon across the ribbon is shown between the two pairs of co-operating tools. These rollers may also assist in driving the glass but generally speaking it is not necessary that every set of rollers be driven, in which case the rollers of undriven sets run freely and merely support the ribbon between the respective co-operating pairs of polishing tools.

Figure 2:
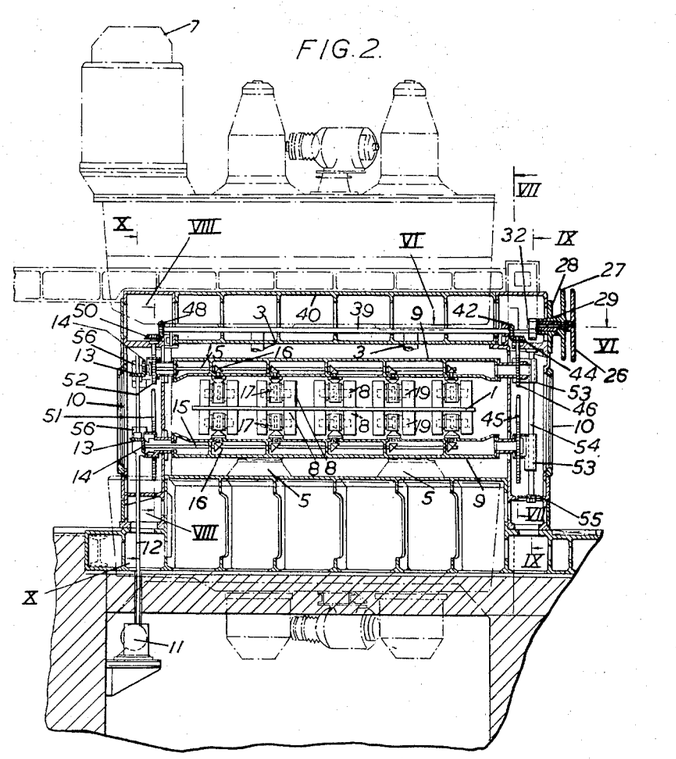
Figure 2 is a sectional elevation taken on the line II—II of Figure 1 and looking in the direction of movement of the ribbon.
Figure 3:
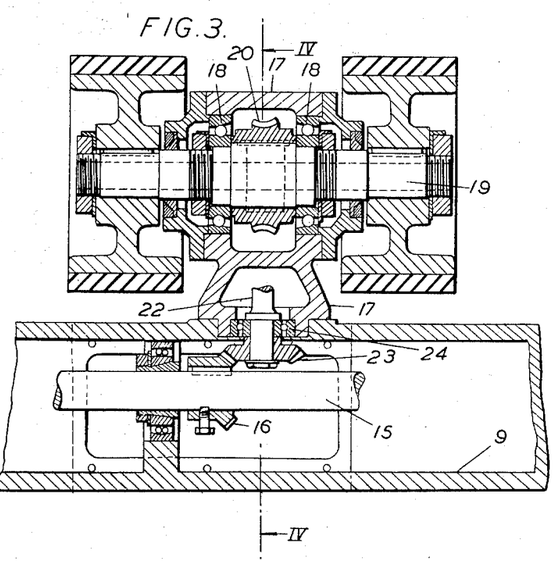
Figure 3 is a sectional elevation of one pair of the short driving rollers shown in Figure 2 but to a larger scale, illustrating the actuating means for each pair of rollers in the two sets.

The hollow beams 9 are supported in hollow columns 10 in manner hereinafter described at each end of the beam and as clearly shown in Figure 2 a motor 11 is provided for each set of driving rollers above and below the ribbon, the motor driving a vertical shaft 12 carrying bevels 13, which mesh with bevels 14 mounted on horizontal shafts 15 within the respective hollow beams 9.

The shafts 15 are provided with bevels 16 adjustable axially of the shafts (see Figure 3), one for each pair of short rollers, the bevels 16 being arranged in juxtaposition to a series of brackets 17 one for each pair of rollers 8. Each bracket 17 is provided with axle bearings 18 for an axle 19 on each end of which a roller is secured. To each axle is secured a worm wheel 20 which is actuated by a worm 21 mounted on a power spindle 22 provided with a bevel 23 which meshes with the respective bevel 16 on the horizontal shaft 15. Each power spindle 22 is mounted in bearing 24 located in the respective bracket 17 and as clearly shown in Figure 4 each bracket 17 is secured on its respective beam by studs 25.

From the foregoing it will be observed that each motor 11 (one is provided for each pair of sets of driving rollers 8) transmits power through the respective vertical shaft 12 to the associated pair of horizontal shafts 15 which in turn, synchronously drive all the bevels 16 thus driving the related spindles 22 which actuate the worm wheels 20 with each of which is operatively associated a pair of rollers 8, one on each end of the axle 19 passing through each worm wheel. Thus it can be stated that in the construction illustrated in Figures 1–5 the pairs of rollers in each set are driven in parallel from the horizontal shafts 15. The rollers 8 are all rubber covered and thus a frictional drive is imparted to the ribbon 1 between each two sets of driving rollers.

The beams 9 are mounted for vertical adjustment relatively to one another and with respect to the machine by operating means housed in the hollow columns 10. To this end hand wheels 26, 27 are mounted on one of the columns 10 hereinafter described (for sake of clarity) as on the "operating" side of the machine, the other side of the machine being referred to as the "driving" side.

The upper part of the column 10 on the operating side is provided with a removable plate 28 formed with a bearing 29, for a sleeve 30, through which passes a spindle 31 in which is keyed the hand wheel 26, the hand wheel 27 being keyed to the sleeve 29, thus in turning the hand wheel 26 the spindle 31 is turned, and on turning the wheel 27 the sleeve 30 is rotated on the spindle. The spindle carries a spur wheel 32 and the sleeve a spur wheel 33, the former meshes with a pinion 34 and the latter with a pinion 35, each secured on the reduced ends 36 and 37 of parallel shafts 38 and 39, housed in a hollow girder 40 connecting the upper ends of the columns 10.

On the reduced ends 36, 37 are bevels 41 and 42 which mesh respectively with bevels 43, 44 secured to vertically disposed spindles 45 and 46 on the operating side of the machine. Each spindle is threaded, the spindle 45 being in threaded engagement with the lower beam 9 and the spindle 46 being in threaded engagement with the upper beam 9.

On the driving side of the machine the shafts 38 and 39 carry bevels 47 and 48 respectively which mesh with bevels 49 and 50 secured to vertical spindles 51 and 52. The spindle 51 is in threaded engagement with the lower bearing and the spindle 52 is in threaded engagement with the upper bearing.

Thus the lower beam 9 is moved laterally in a vertical plane by the rotation of spindles 45 and 51 on the actuation of the hand wheel 26 and the upper beam 9 is similarly moved by the rotation of the spindles 46 and 52 on the actuation of the hand wheel 27.

On the operating side of the machine the respective end of each beam 9 is provided with a guide block 53 apertured to slide along guide rods 54 suitably mounted in the hollow columns 10 on plates 55, and on the driving side of the machine the respective end of each beam has a housing 56, the sides of which are grooved as indicated at 57 (see Figure 10) to slide along guide bars 58 mounted on the respective columns 10. These housings also carry the bearing for the bevel pairs 13, 14 driven by the vertical spindle 12, to which the bevels 13 are splined, from the motor 11. Thus the drive to the two sets of driving rollers is maintained during adjustment of the beams 9 by actuating the hand wheels 26, 27.

Instead of mechanically driving the pairs of rollers 8 as just described an electrical motor may be housed in each brackets 17 and operatively associated with the respective axle 19, the energising current being taken to each motor through leads arranged within the respective beams, so that all the pairs are synchronously driven from electrical mains as will be readily understood by those skilled in the electrical arts.

Figure 4:
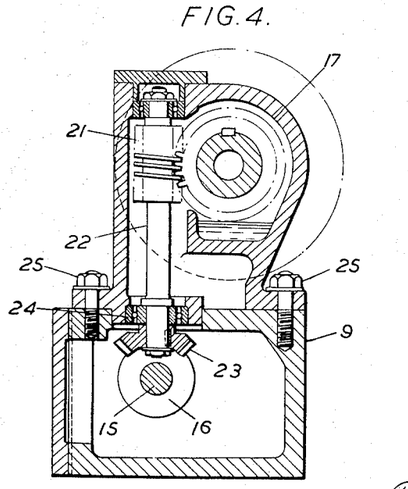
Figure 4 is a sectional elevation taken on the line IV—IV of Figure 3.
Figure 5:
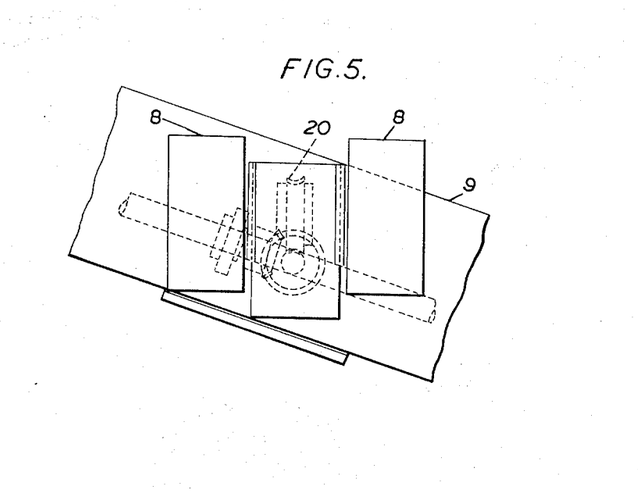
Figure 5 is a plan view of the arrangement shown in Figure 3.
Figure 6:
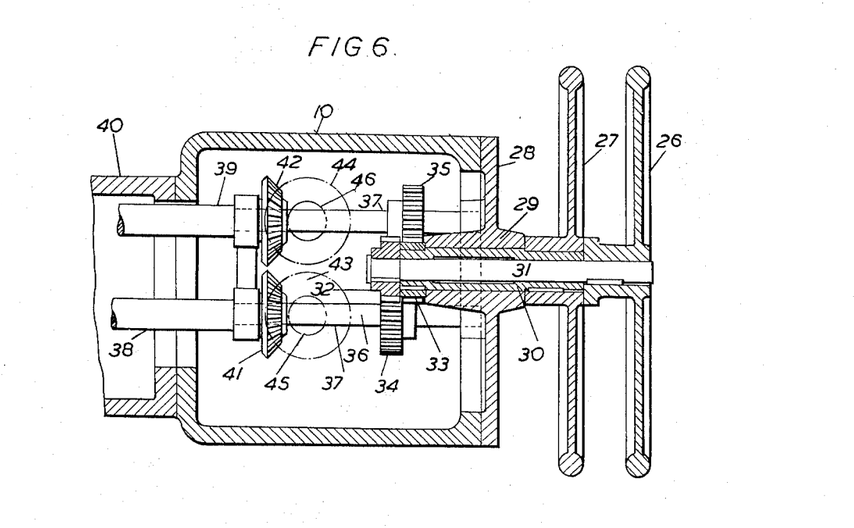
Figure 6 is a fragmentary plan view, partly in section, taken on the lines VI—VI on Figure 2, showing to a much larger scale the arrangement of hand wheels provided for raising and lowering the beams carrying the driving rollers.
Figure 7:
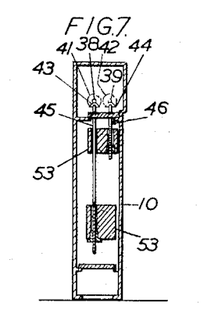
Figures 7 and 8 are sectional elevations taken on the lines VII—VII and VIII—VIII respectively in Figure 2 further illustrating the connection between the hand wheels and the means for raising or lowering the beams.
Figure 8:
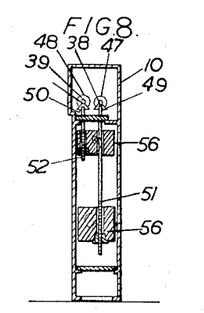
Figure 9:
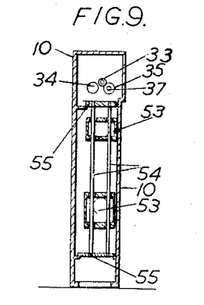
Figure 9 is a sectional elevation taken on the lines IX—IX of Figure 2, showing means for guiding the ends of the beams on the operating side of the machine, that is to say, the side of the machine on which the hand wheels are mounted.
Figure 10:
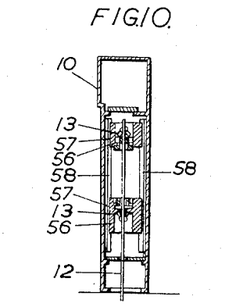
Figure 10 is a sectional elevation taken on lines X—X of Figure 2 showing the guiding means on the other side of the machine for the ends of the beams and illustrating also the mounting of integers in the drive to the sets of rollers enabling the drive to continue during raising or lowering the beams.
Figure 11:
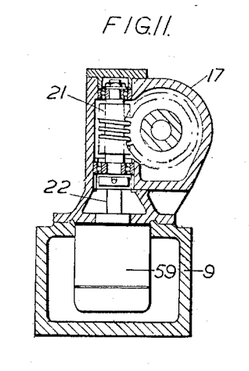
Figure 11 is a view similar to Figure 4 showing the employment of an electric motor individual to each pair of rollers in the drive system carried by the beam.

In Figure 11 the employment of an electric motor for actuating the power spindle 22 is illustrated, the motor being identified by the reference 59, the motor being supported in the beam 9 by securing it to the bracket 17 by means (not shown) so that the motor is disposed coaxially with the spindle 22. It will be seen, therefore, that the construction shown in Figure 11 differs only from that which is illustrated in Figure 4 by the elimination of the driving spindle 22 and the bevel pairs which actuate the spindle 22 by the substitution of the motor 59 which is directly connected to the respective power spindle, the mains wiring for the motors housed in the beam being carried within the beam.

Figure 12:
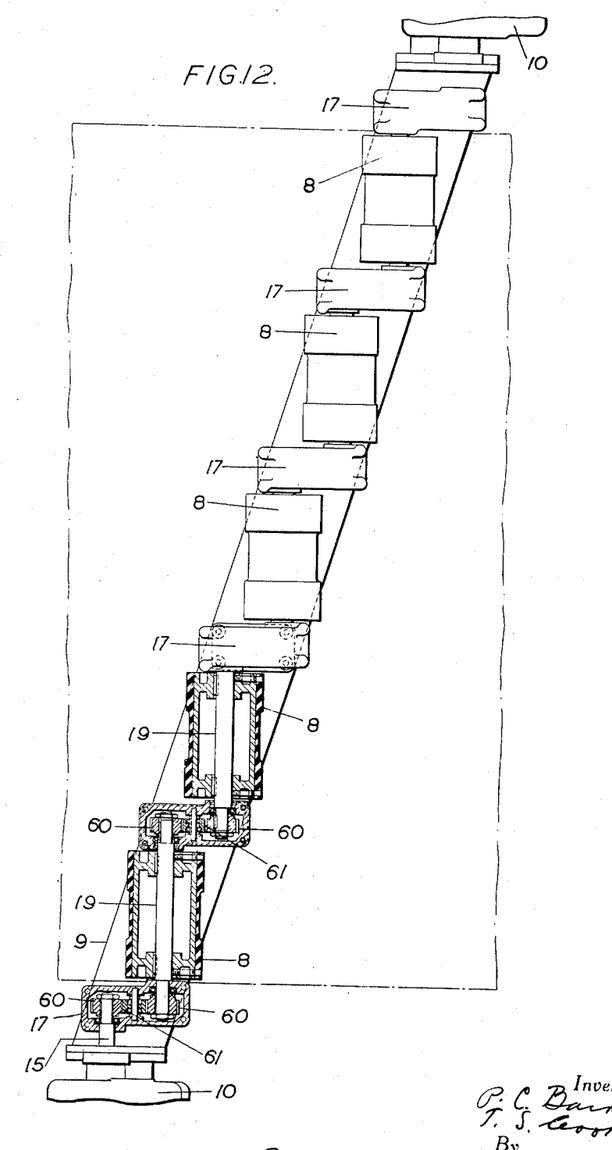
Figure 12 is a plan view, partly in section, showing a further alternative means of mounting and actuating the short rollers in the two sets of driving rollers.
Figures 13, 14:
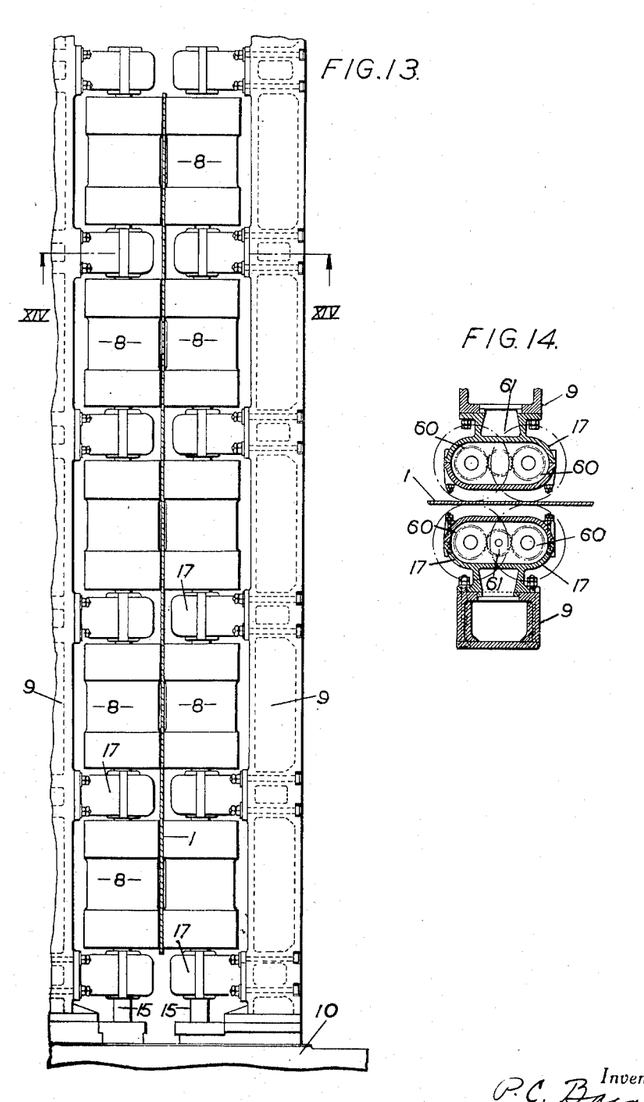
Figure 13 is an elevation thereof looking in the direction of movement of the ribbon of glass.
Figure 14 is a sectional elevation taken on the lines XIV—XIV of Figure 13.

Referring now to Figures 12, 13 and 14 which show a further alternative arrangement in which the driving rollers arranged in echelon across the width of the ribbon are driven in series.

This method of driving the rollers is effected mechanically and the drive imparted to the roller at one end of the echelon series is transmitted through successive rollers to the end roller of the other end of the series. To this end a hollow beam 9 is provided with brackets 17 secured at suitable intervals along the beam 9 so as to accommodate between them the rollers 8, each of which rollers is mounted on an axle 19 the ends of which are housed in adjacent brackets 17 and on each end of each axle is a pinion 60. Between the two pinions 60 in each bracket is an idler wheel 61 so that all the axles 19 are driven in the same direction.

As in the previous construction a motor 11 is provided which actuates a vertical shaft 12 which drives a bevel 13 meshing with a bevel 14 on a short horizontal driving shaft 15. In this arrangement only the short horizontal shaft 15 is shown in Figures 12 and 13.

Power communicated to the short shaft 15 is imparted to the first pinion 60 then transmitted through the idler to the second pinion 60 within the first bracket 17. Thus the first roller 8 is actuated by the gearing in the first bracket.

Similarly the axle 19 with the pinion 60 on its right hand end (as viewed in Figure 12) through the intermediary of the respective idler 61 becomes the actuating means for the next roller 8 in succession through the series, and similarly throughout the series each roller transmits power to the gears in the following bracket 17 to the next roller in succession.

By such arrangement the rollers are arranged in echelon and their axles are at right angles to the direction of the path of the glass 1, the echelon series being arranged obliquely to the path of the glass and as already mentioned preferably in parallel relation with the vertical plane containing the axes of the surfacing tools with which the driving rollers are associated.

Figure 15:
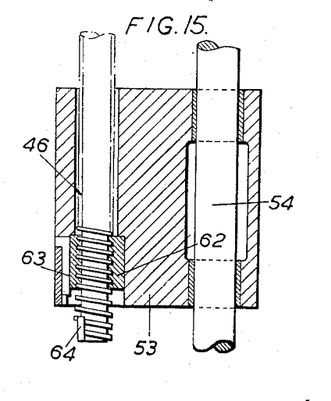
Figure 15 is a sectional elevation as hereinafter described.

In order to avoid damage to the glass when operating the hand wheel 27 to dispose the driving rollers 8 in operative relation with the upper surface of the ribbon of glass 1, spindles 46 are connected to the ends 53, 56 of the respective beam 9 as most clearly illustrated in Figure 15, from which it will be observed that the threaded end of the spindle engages in a nut member 62 which is located by a key 63 in the end member of the beam. By such arrangement, the nut with which the spindle engages is in sliding engagement with the beam. Accordingly, as the beam is being lowered until the rollers engage the upper surface of the glass, further operation of the hand wheel 27 will effect displacement of the nut member along the key 63, instead of exerting further downward pressure on the beam. The spindle 46 is provided with a terminal key stop 64 to prevent the nut riding off the spindle.

In the arrangement shown in Figures 1 to 11 each set of driving rollers comprises a series of pairs which are individually driven, either by the bevel pair 16, 23, or by the respective motor 59. Accordingly, it is not necessary as in the construction shown in Figures 12 to 14 that all the rollers in each set are driven and the invention comprehends a series of rollers arranged in echelon, whether or not all of the rollers are driven.

In an alternative preferred construction according to the invention in which each beam supporting the driving rollers is provided with a series of hollow brackets provided with axle bearings for the rollers, the brackets housing the actuating means for the axles, each successive axle from one end of the beam may be actuated by the preceding axle through spur gearing housed in the brackets, each bracket housing a spur wheel for each of the two axles entering therein and an intermediate idler wheel meshing with the spur wheels, and by means for driving the first axle at the said one end of the beam.

When it is desired to repair the driving rollers, it is, of course, necessary to raise the upper beam or to lower the lower beam and then it is necessary to reset the moved beam so that the requisite pressure is applied to the glass to effect the drive in the desired direction. Accordingly any means of raising and lowering the beams may be employed which maintains the drive to the respective driving rollers through the vertical spindle 12 and the respective bevel pairs 13, 14 and as hereinafter more fully described, the ends of the beams adjacent to the vertical spindle 12, that is to say, on the driving side of the machine, are carried by the ends of the beams, the bevels 13 being slidable on the spindle 12, the latter being spliced to enable the drive to be maintained whilst the bevel pairs are moved axially of the spindle, and the invention comprehends the provision of means for raising or lowering the beams wherein the end of each beam is in threaded engagement with a vertical spindle actuated from one hand wheel and the other beam is in threaded engagement with a second pair of spindles actuated by a second hand wheel, so that either or both beams can be raised or lowered by actuating the hand wheels to adjust the rollers to support the ribbon at the correct level.

By the present invention apparatus for the surfacing of a moving ribbon of glass is provided with driving means which occupy minimum space so that a great saving in factory space is achieved as compared with the space occupied by such apparatus when the driving rollers are disposed in usual manner at right angles to the direction of the movement of the glass.

We claim:

1. Apparatus for simultaneously surfacing both surfaces of a moving ribbon of glass, including cooperating pairs of tools the axes of which are disposed in vertical planes disposed obliquely to the path of the ribbon, the tools of a pair operating on one surface being coaxial with a similar pair operating on the other surface and driving means for the ribbon, operating against each face of the ribbon, arranged between one pair of tools and an adjacent pair longitudinally of the path of the ribbon, characterised by each driving means being constituted by a set of short rollers carried by a beam spaced from said vertical planes and extending obliquely to the path of the ribbon and substantially in the same general direction as said vertical planes across said ribbon, whereby the rollers are arranged in echelon across the ribbon, the axes of the driving rollers being disposed at right angles to the direction of movement of the ribbon, whereby the rollers engage the ribbon in areas contiguous with both tools of an obliquely disposed coaxial pair.

2. Apparatus for simultaneously surfacing both surfaces of a moving ribbon of glass, including cooperating pairs of tools the axes of which are disposed in vertical planes disposed obliquely to the path of the ribbon, the tools of a pair operating on one surface being coaxial with a similar pair operating on the other surface and driving means for the ribbon, operating against each face of the ribbon, arranged between one pair of tools and an adjacent pair longitudinally of the path of the ribbon characterised by each driving means being constituted by a set of short rollers carried by a beam spaced from said vertical planes and extending obliquely to the path of the ribbon and substantially in the same general direction as said vertical planes across said ribbon, whereby the rollers are arranged in echelon across the ribbon, the axes of the driving rollers being disposed at right angles to the direction of movement of the ribbon, whereby the rollers engage the ribbon in areas contiguous with both tools of an obliquely disposed coaxial pair, each beam being provided with a series of hollow brackets provided with axle bearings for the rollers, and actuating means for the axles mounted inside the said brackets.

3. Apparatus for simultaneously surfacing both surfaces of a moving ribbon of glass, including cooperating pairs of tools the axes of which are disposed in vertical planes disposed obliquely to the path of the ribbon, the tools of a pair operating on one surface being coaxial with a similar pair operating on the other surface and driving means for the ribbon, operating against each face of the ribbon, arranged between one pair of tools and an adjacent pair longitudinally of the path of the ribbon characterised by each driving means being constituted by a set of short rollers carried by a beam spaced from said vertical planes and extending obliquely to the path of the ribbon and substantially in the same general direction as said vertical planes across said ribbon, whereby the rollers are arranged in echelon across the ribbon, the axes of the driving rollers being disposed at right angles to the direction of movement of the ribbon, whereby the rollers engage the ribbon in areas contiguous with both tools of an obliquely disposed coaxial pair, each beam being provided with a series of hollow brackets provided with axle bearings for the rollers, and actuating means for the axles comprising a driving shaft for the respective set of rollers, housed by the respective beam, bevel wheels spaced along the shaft and keyed thereto, a spindle carried by each hollow bracket at right angles to the driving shaft, a bevel gear on each spindle with which one of the bevel wheels on the shaft meshes to drive the spindle, actuating means for the respective roller axle comprising a worm wheel on the respective axle and a worm on each spindle meshing with the worm wheel, and means for synchronously driving the driving shafts above and below the ribbon of glass.

4. Apparatus according to claim 2 wherein the rollers in each set are mounted in pairs, one roller being keyed on each end of each axle.

5. Apparatus according to claim 3 wherein the rollers in each set are mounted in pairs, one roller being keyed on each end of each axle.

6. Apparatus according to claim 2 characterised by an electric motor housed in the beam for actuating the respective axle, said hollow beam carrying the mains supplying current to the motors.

7. Apparatus according to claim 2 characterised by each successive axle from one end of the beam being actuated by the preceding axle through spur gearing housed in the brackets, each bracket housing a spur wheel for each of the two axles entering therein and an intermediate idler wheel meshing with the spur wheels, and by means for driving the first axle at the said one end of the beam.

8. Apparatus according to claim 1 wherein the end of each beam is in threaded engagement with a vertical spindle actuated from one hand wheel and the other beam is in threaded engagement with a second pair of spindles actuated by a second hand wheel, so that the beams can be raised or lowered by actuating the hand wheels to adjust the rollers to support the ribbon at the correct level.

9. Apparatus according to claim 2 wherein the end of each beam is in threaded engagement with a vertical spindle actuated from one hand wheel and the other beam is in threaded engagement with a second pair of spindles actuated by a second hand wheel, so that the beams can be raised or lowered by actuating the hand wheels to adjust the rollers to support the ribbon at the correct level.

References Cited in the file of this patent

UNITED STATES PATENTS

| | | |
|---|---|---|
| 1,962,765 | Crowley et al. | June 12, 1934 |
| 2,270,362 | Waldron et al. | Jan. 20, 1942 |
| 2,285,318 | Waldron | June 2, 1942 |
| 2,355,750 | Premo | Aug. 15, 1944 |

FOREIGN PATENTS

| | | |
|---|---|---|
| 495,415 | Belgium | May 15, 1950 |
| 504,003 | Belgium | Dec. 15, 1951 |
| 523,427 | Great Britain | July 15, 1940 |